Feb. 3, 1942.    G. JAECKEL    2,272,119
LENS AND THE MANUFACTURE THEREOF
Original Filed Sept. 8, 1939    3 Sheets-Sheet 1

Inventor
GEORG JAECKEL,
By Barley & Carere
Attorney

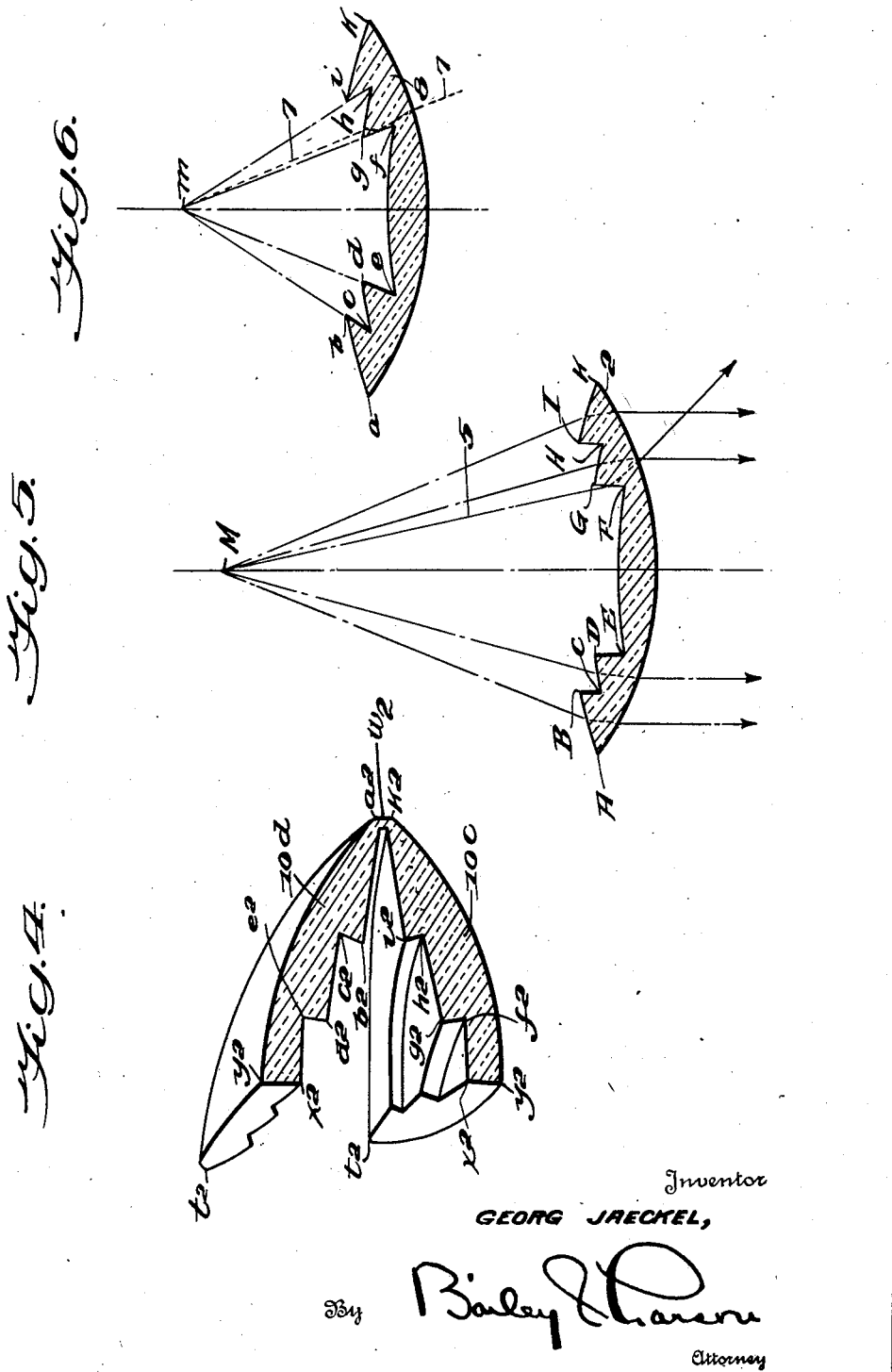

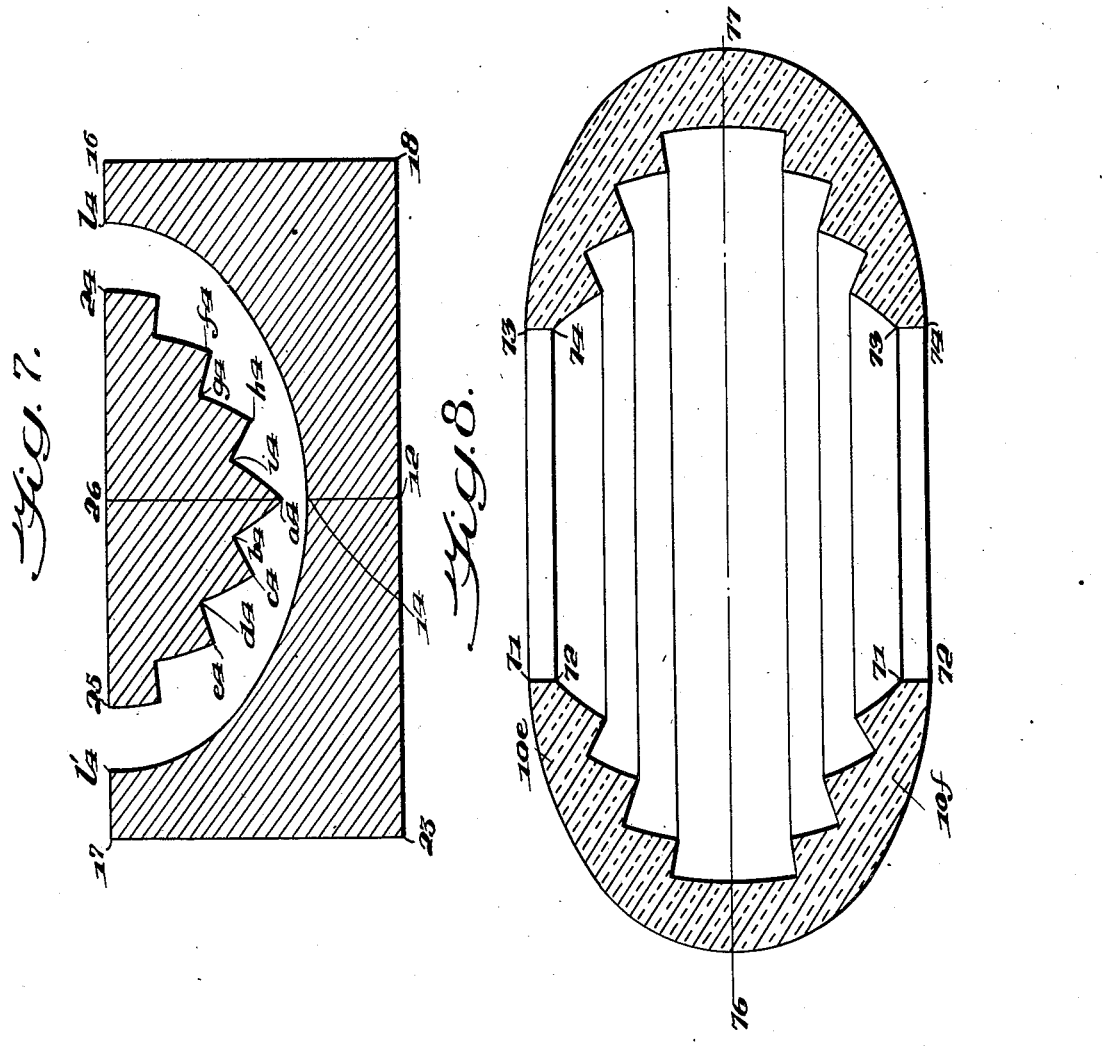

Patented Feb. 3, 1942

2,272,119

UNITED STATES PATENT OFFICE 2,272,119

LENS AND THE MANUFACTURE THEREOF

Georg Jaeckel, Berlin-Lichterfelde, Germany, assignor to the firm Sendlinger Optische Glaswerke G. m. b. H., Berlin-Zehlendorf, Germany Original application September 8, 1939, Serial No. 294,031, now Patent No. 2,246,098, dated June 17, 1941. Divided and this application September 8, 1939, Serial No. 294,032. In Germany March 20, 1936

5 Claims. (Cl. 49—79)

The invention relates to lenses and to the manufacture thereof.

This application is a division of my application S. N. 294,031, filed September 8, 1939, executed concurrently herewith for improvements in Lenses and the manufacture thereof, and which issued as Patent No. 2,246,098, June 17, 1941.

A primary object of the invention is to produce a stepped lens of the Fresnel type from pressed glass which is designed to prevent the loss of light passing through the lens.

Further objects and advantages of the invention will appear more fully from the following description, particularly when taken in conjunction with the accompanying drawings, which form a part thereof.

In the drawings:

Fig. 4 shows similarly a modified form of blank;

Fig. 5 shows diagrammatically the light path in the ordinary stepped lens produced in the manner shown in Fig. 1;

Fig. 6 shows diagrammatically the path of light through a lens embodying one form of the invention;

Fig. 7 shows in cross section a mold for making a lens according to the invention; and Fig. 8 shows a modified form of lens embodying the invention with its method of production.

Figure 1:
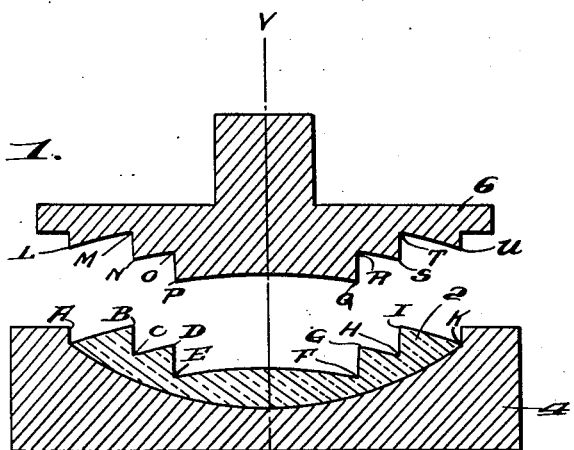
Fig. 1 shows the procedure ordinarily used in manufacturing a stepped lens.

The usual type of stepped lens 2 as shown in Fig. 1 has a series of steps such as AB, CD, EF, GH, IK connected by surfaces BC, DE, GF and IH. The lower surface may have any desired shape but is usually a smooth convex curve. The lens is produced by pressing in a mold 4, the plunger 6 of which has steps LM, NO, PQ, RS and TU connected by surfaces MN, OP, RQ and TS. Obviously in the production of a lens in this manner the step-connecting surfaces, such as BC, must be either parallel to the axis VW of the lens 2, this line VW also indicating the direction of movement of the plunger die 6 in shaping the glass, or must be outwardly inclined, that is, converging toward a point on the side of the convex surface of the lens. Such surfaces could not be undercut since then it would be impossible to remove the plunger die 6 after the pressing operation.

The disadvantage of a lens of this type is shown in Fig. 5. Assuming that light comes from the focus M of the lens, some of this light will strike the step-connecting surfaces, such as the surface GF. This is indicated by the arrow 5 in Fig. 5. This light will be refracted outwardly and will be lost. Obviously the greater the relative aperture of the lens the greater will be the amount of light so lost, since a greater proportion of the light will strike the step-connecting surfaces.

According to the invention this loss of light is avoided by a method which makes the step-connecting surfaces radial to the main focus of the lens. As shown in Fig. 6, for example, step-connecting surfaces $bc$, $de$, $gf$, and $ih$ of lens 8 all point towards or are radial to the same point $m$ which is the lens focus. Obviously, no light will strike these surfaces so that they are optically inactive, and therefore no light will be lost through outward refraction from the step-connecting surfaces. In the case of a circular lens, these surfaces will, of course, represent conical surfaces of which the focus $m$ is the apex. The surfaces must, of course, be inwardly inclined.

The production of such a lens by the method shown in Fig. 1 would be impossible, since after the molding the plunger die could not be removed from the lens. In order to produce a lens, therefore, the method shown in Figs. 3 and 7 is utilized.

Figure 2:
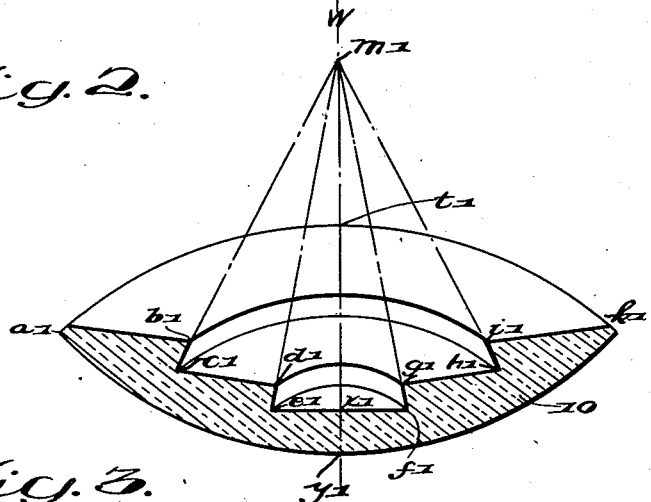
Fig. 2 shows, in perspective and partly in cross section, a lens produced according to the invention.
Figure 3:
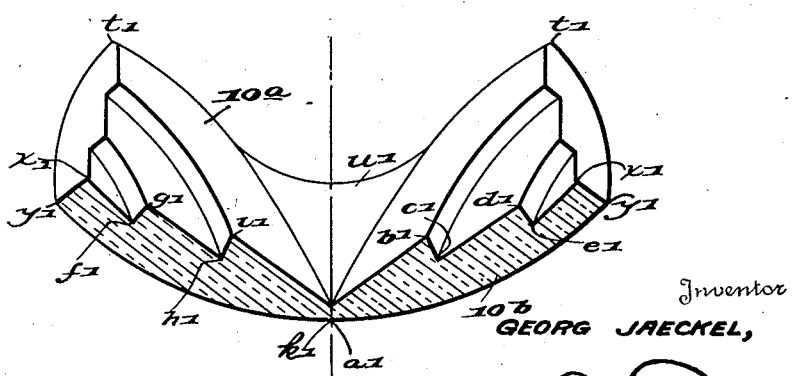
Fig. 3 shows, in perspective and partly in cross section, a blank used for making the lens disclosed in Fig. 2.

Assuming that the lens 10 is to have the form shown in Fig. 2, in which the step-connecting surfaces are radial to the focus $m_1$, a block is molded in the form shown in Fig. 3, the block there being shown in perspective, and partly in section, for producing a circular stepped lens. The outer points $a_1$ and $k_1$ of the lens of Fig. 2 are shown at the center of Fig. 3, dividing the same into two parts 10a and 10b, while the central plane $t_1$, $x_1$, $y_1$ of Fig. 2 is shown at the outside of Fig. 3. When so molded it will be evident that steps $g_1f_1$, $t_1h_1$, $b_1c_1$, and $d_1e_1$, are all faced outwardly, that is to say, they are not undercut, and converge towards points on the side of the concave surface of the lens. The step surfaces descend towards the outside of the body of Fig. 3, whereas in the lens to be formed such surfaces descend towards the center. Obviously a body of the type shown in Fig. 3 can be produced without difficulty by the molding and pressing operation of the type shown in Fig. 1. The die plunger may be lifted after the pressing without difficulty.

The two halves connected at $k_1$, $a_1$ may be for convenience in manufacture further connected by a web $u_1$.

After the body of the type shown in Fig. 3 is molded and pressed, it is broken along the line $k_1$, $a_1$ and through the web $u_1$. The surfaces $t_1$, $x_1$, $y_1$ at opposite sides of the mold are then located opposite each other and fused together, thus producing the lens 10 shown in Fig. 2. The web $u_1$ may then be ground off from the lens.

In the modification shown in Fig. 4, the lens block with its surface indicated by the lines joining the successive points $x_2$, $f_2$, $g_2$, $h_2$, $i_2$, $k_2$, $b_2$, $c_2$, $d_2$, $e_2$, $x_2$, $y_2$, $a_2$, $k_2$, $y_2$ is molded in the shape shown therein, having two parts 10c and 10d. In this form it will be noted again that there are no undercut surfaces, and that the step-connecting surfaces converge towards points on the side of the concave surface, so that the plunger may be easily removed after the pressing operation. The two parts 10c and 10d are then separated by breaking the portion $a_2$, $k_2$, and the surfaces $t_2$, $x_2$, $y_2$ are brought together and fused, producing a lens similar to that of Fig. 2.

While in Fig. 3 the breaking on line $k_1$, $a_1$ produces lines of breakage on both the upper and lower surfaces of the lens, the structure of Fig. 4 requires breakage only through the connecting web $u_2$ which may then be ground off, or used to support the lens during further grinding.

Fig. 7 shows the mold for producing the lens of the type shown in Fig. 6. The desired shape of the lens blank is represented in Fig. 7 by the white space between the mold parts. The bottom mold section is formed in two parts, 12, 14, $l_4$, 16, 18 and 12, 14, $l'_4$, 17, 23, respectively, said parts being substantially symmetrical and separated along the line 12, 14. The surface $l_4$, 14, $l'_4$ has the shape of the convex side of the lens blank which is desired.

The plunger die is also produced in two parts $a_4$, 24, 26 and $a_4$, 25, 26. These two parts are separated along the line $a_4$, 26. The surface of the plunger corresponds to that desired for the inside or concave surface of the lens blank to be produced.

It will be noted that surfaces 12, 14; and $a_4$, 26 are straight, and that they are in a straight line in the mold of Fig. 7. Surfaces 12, 14 are secured together to produce the lower mold part. For the plunger die part, surfaces $a_4$, 26 are secured to produce the plunger die.

By pressing glass with the mold bottom and plunger die shown in Fig. 7, a lens body is produced. This lens body is then broken along the line $a_4$—14, and surfaces $l'_4$, 25 and 24, $l_4$ are joined together. The final lens body is substantially similar to that shown in Fig. 6 in its characteristics.

Fig. 8 shows the procedure for manufacturing a lens for ships' lanterns, for example, of the annular type. Such lens is not formed as a surface of revolution about the central path of the light, but as a surface produced by the displacement of a closed outline of the shape shown either in a straight line or in a circle.

Such annular lenses can be produced in the manner shown in Fig. 8. The lens is produced in the two separate, identical parts shown in the figure, and divided therein by the line 76—77. Obviously either the lower half or the upper half of the lens may be molded without difficulty, as there are no undercut steps during the molding. The connecting portions 71, 72, 73, 74 may be broken out after the parts are formed. The portions 10e, 10f are then connected along the line 76—77, and the lens is completed.

While I have described herein some embodiments of my invention, I wish it to be understood that I do not intend to limit myself thereby except within the scope of the appended claims.

I claim:

1. A method of forming a concavo-convex lens with step surfaces on the concave side of the lens descending towards the center of the lens and step-connecting surfaces all converging towards at least one point spaced from the concave side of the lens, comprising molding a body in concavo-convex form in two symmetrical parts centrally joined with the step surfaces descending towards the outside of the body, dividing the body centrally, and connecting the outer parts of the body together to form the lens.

2. A method of making stepped lenses having inwardly facing step-connecting surfaces converging towards the focus of the lens, comprising simultaneously molding a body in two symmetrical lens parts centrally joined with said step-connecting surfaces facing outwardly, dividing said body centrally, and joining the outer parts of the body together to form the lens.

3. A method of forming a concavo-convex lens with step surfaces on the concave side of the lens descending towards the center of the lens and step-connecting surfaces all directed towards a common point spaced from the concave side of the lens, comprising molding a body in concavo-convex form in two symmetrical parts centrally joined with the step-connecting surfaces converging towards the concave side of the body, dividing the body centrally, and connecting the outer parts of the body together to form the lens.

4. A method of forming a concavo-convex lens with step surfaces on the concave side of the lens descending towards the center of the lens and step-connecting surfaces all directed towards a common point spaced from the concave side of the lens, comprising molding a body in concavo-convex form in two symmetrical parts centrally joined with the step surfaces descending towards the outside of the body, and the step connecting surfaces converging towards points on the concave side of the body dividing the body centrally, and connecting the outer parts of the body together to form the lens.

5. A method of making concavo-convex stepped lenses having inwardly directed step connecting surfaces converging towards at least one point spaced from the concave side of the lens, comprising simultaneously molding two connected symmetrical lens parts with the step connecting surfaces converging towards at least one point spaced from the concave side of the lens and the steps descending towards the outside of the said body, separating said parts, and connecting the outer portions thereof to form the lens.

GEORG JAECKEL.